J. CLARK.
CLAMPING RING FOR PIPE COUPLINGS.
APPLICATION FILED JULY 17, 1908.
946,933.
Patented Jan. 18, 1910.
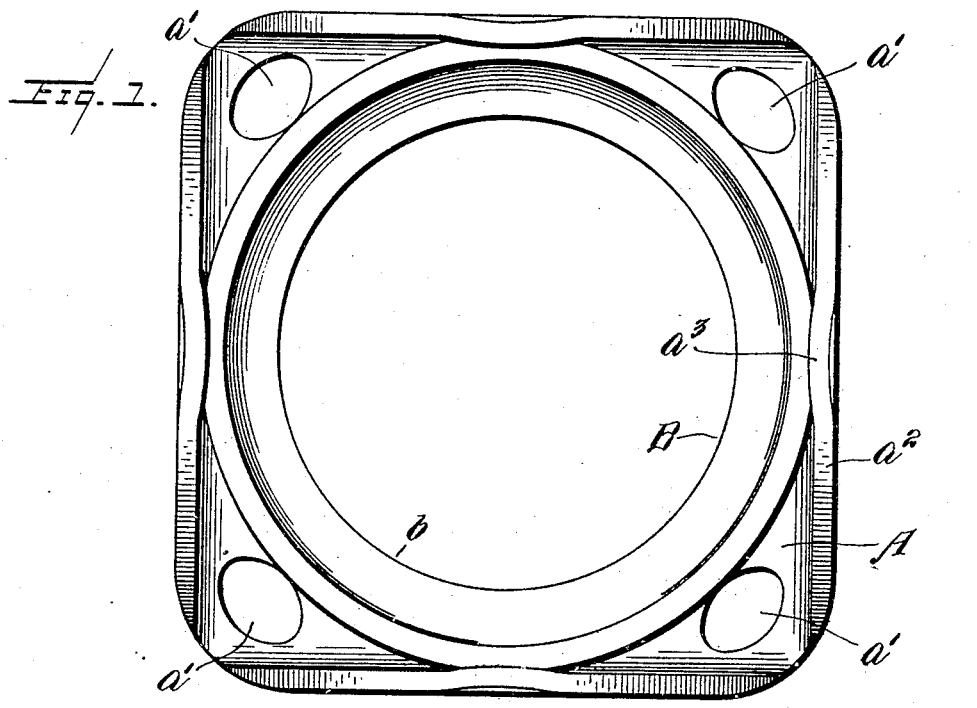
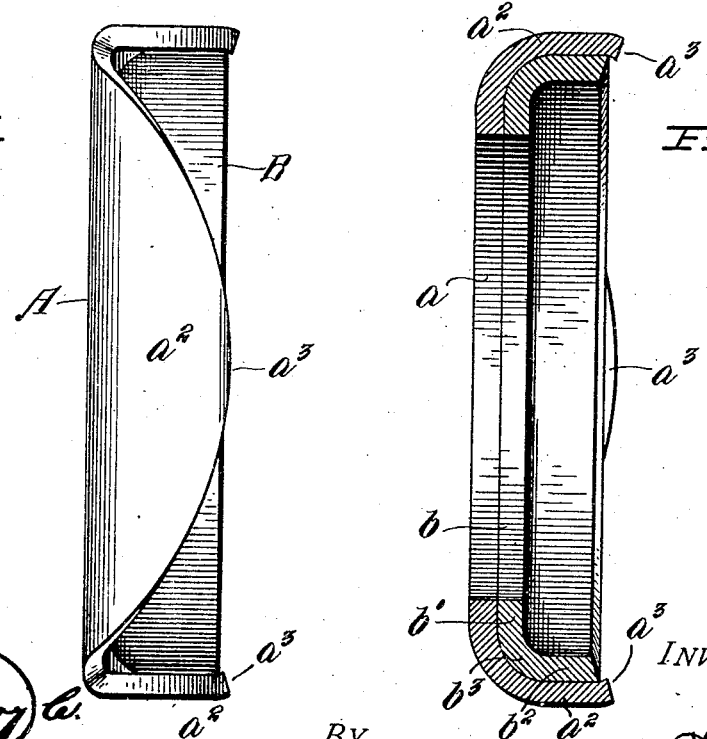
WITNESSES:
INVENTOR
James Clark
BY
Whitaker Prevost, Attorneys

UNITED STATES PATENT OFFICE.

JAMES CLARK, OF BRADFORD, PENNSYLVANIA, ASSIGNOR TO S. R. DRESSER MANUFACTURING COMPANY, OF BRADFORD, PENNSYLVANIA.

CLAMPING-RING FOR PIPE-COUPLINGS.

946,933.  Specification of Letters Patent.  Patented Jan. 18, 1910.

Application filed July 17, 1908.  Serial No. 444,041.

*To all whom it may concern:*

Be it known that I, JAMES CLARK, a citizen of the United States, residing at Bradford, in the county of McKean and State of Pennsylvania, have invented certain new and useful Improvements in Clamping-Rings for Pipe-Couplings; and I do hereby declare the following to be a full, clear, and exact description of the invention, such as will enable others skilled in the art to which it appertains to make and use the same.

My invention consists in the novel features hereinafter described reference being had to the accompanying drawing which illustrates one form in which I have contemplated embodying my invention and said invention is fully disclosed in the following description and claims.

The object of my invention is to provide a clamping ring for pipe couplings, and particularly for rubber packed pipe couplings, formed of two parts, which are made separately, one of which I term the "plate portion" and the other of which I term the "flange portion," which parts are so constructed as to very perfectly reinforce each other, and the plate portion being stiffened between the bolt holes therein, by bending portions of the plate member substantially perpendicularly to the plane of the plate member, and into engagement with the exterior of the flange member, the lines upon which the up-turned portions of the plate member are bent being straight and substantially tangential to the annular flange member.

My invention also contemplates mechanically uniting the two separate parts of the clamping ring, by bending the upturned portions of the plate member over the outer edge of the flange member and thus securing the two parts permanently together without welding.

In the accompanying drawings, Figure 1 represents a top plan view of my improved clamping ring. Fig. 2 is a side elevation, and Fig. 3 is a central sectional view of the same.

In the drawings A represents the plate member and B represents the flange member, which are made separately and preferably from sheet steel or wrought iron of the proper thickness.

The flange member B is preferably formed from a flat annular plate of sheet metal, and is bent or forged into a cup form with a central pipe aperture $b$ in the bottom of the cup, the walls of the flange member being provided with an annular portion $b'$ surrounding the pipe aperture and lying substantially perpendicular to the axis thereof, an annular portion $b^2$ disposed substantially perpendicularly to the portion $b'$, and an annular curved portion $b^3$ connecting the parts $b'$ and $b^2$, thus forming a packing recess.

The plate member A is preferably formed from a flat annular plate, having a central pipe aperture $a$ adapted to register with the aperture $b$ in the flange member B. I do not limit myself to the use of a plate having its exterior edge circular but I prefer to employ this form. The plate member is provided with a plurality of bolt holes $a'$ arranged around the pipe aperture so as to allow the flange member to lie within the bolts when in place, and edge portions $a^2$ of the plate member between adjacent bolt holes, are bent toward one side of the plate member so as to form a seat for the flange member, and to reinforce the adjacent portions thereof, as shown best in Fig. 3.

The lines upon which the up-turned portions of the plate member are bent, are as previously stated, straight and substantially tangential to the plate member. By this construction the bent up portions $a^2$ of the plate member are not stretched or distorted but preserve their full thickness and strength, the only bending of the plate member being along the straight tangential lines. The plate member is thus brought into the general form of a polygon upon one face of which the flange member is held, the pipe apertures in the two parts registering and the bent up portions forming perpendicular trusses, practically springing from the sides of the polygonal central portion of the plate member and leaving corners containing the bolt holes, outside of the periphery of the flange or cup member.

I prefer to assemble the two parts of the clamping ring while the plate member is in a highly heated condition. The flange member B (which is preferably cold) is placed upon the plate member, and the pipe apertures $a$, $b$ brought into registration, the edge or marginal portions $a^2$ of the plate member are then bent up around the curved exterior surface of the flange member, at points between the bolt holes, and are preferably bent slightly over the outer edge of the flange member, as shown at $a^3$ thus locking the two parts rigidly together.

While I prefer to lock the two parts by bending the marginal portions of the plate member over the flange member I do not limit myself to this construction. The two parts may be formed separately and assembled at the time of use, or the two parts may be assembled and welded or united in other ways if found desirable.

It will be noted that when the exterior edge of the plate member is circular, which is my preferred construction, the bent up edge or marginal portions $a^2$ of the plate member will be segmental in form as seen in Fig. 2 and the central portion of each of said bent up portions will follow the exterior of the flange member, as shown in Fig. 3, thus reinforcing it throughout, and further these bent up portions give great rigidity to the plate member, and at the same time leave angular plain spaces adjacent to their intersection, exterior to the flange member, for the bolt holes $a$.

In the drawing I have shown a ring in which the plate member is provided with four upturned reinforcing portions, engaging the flange member, but it is obvious that I may provide the plate member with two, three, five, six, eight, ten or indeed any desired number of these bent up portions, surrounding and engaging and reinforcing the flange member. Bolt holes will be provided in the plate member ordinarily adjacent to all the intersections of said bent up portions but they may be omitted adjacent to certain of said intersections, if desirable, although I prefer to provide the ring with a number of bent up portions equal to the number of bolt holes and to space the bolt holes equally around the ring.

What I claim and desire to secure by Letters Patent is:—

1. A clamping ring for pipe couplings comprising a plate member provided with a central pipe aperture and bolt holes and a flange member provided with an annular flange disposed perpendicularly to the plate member, and of greater diameter than the pipe aperture therein, and having portions surrounding the pipe aperture in engagement with the plate member, said plate member having marginal portions between adjacent bolt holes bent substantially perpendicularly to the plane of the plate member, along straight lines, giving the plane portion of the plate member a polygonal shape, said bent up marginal portions of the plate member forming trusses springing from the sides of the said polygonal plane portion, and having their central portions, only, in tangential engagement with the exterior of the said annular flange portion of the flange member.

2. A clamping ring for pipe couplings, comprising a plate member provided with a central pipe aperture and bolt holes, and a separately formed flange member engaging one face of said plate member and having an annular portion disposed perpendicularly to the plate member, said plate member having marginal portions between adjacent bolt holes bent substantially perpendicularly to the plane of the plate member, along straight lines, substantially tangential to the flange member and giving the main body of the plate member a polygonal form, the said bent marginal portions of the plate member forming trusses springing from the sides of said polygonal main portion and engaging the exterior of the flange member, the bent up portions of the plate member having portions at their outer extremities bent over the outer edge of the annular flange of the flange member.

In testimony whereof I affix my signature, in the presence of two witnesses.

JAMES CLARK.

Witnesses:
M. E. CLARK,
H. M. WICK.